(12) United States Patent
Wada et al.

(10) Patent No.: US 7,513,696 B2
(45) Date of Patent: Apr. 7, 2009

(54) OPTICAL RECEPTACLE

(75) Inventors: Masanori Wada, Otsu (JP); Hirokazu Takeuchi, Otsu (JP)

(73) Assignee: Nippon Electric Glass Co., Ltd., Shiga-Ken (JP)

( * ) Notice: Subject to any disclaimer, the term of this patent is extended or adjusted under 35 U.S.C. 154(b) by 0 days.

(21) Appl. No.: 10/568,283

(22) PCT Filed: Aug. 12, 2004

(86) PCT No.: PCT/JP2004/011859

§ 371 (c)(1),
(2), (4) Date: Sep. 14, 2006

(87) PCT Pub. No.: WO2005/019893

PCT Pub. Date: Mar. 3, 2005

(65) Prior Publication Data

US 2007/0041686 A1     Feb. 22, 2007

(30) Foreign Application Priority Data

Aug. 20, 2003   (JP) ............................. 2003-295834

(51) Int. Cl.
*G02B 6/36*     (2006.01)
*G02B 6/42*     (2006.01)

(52) U.S. Cl. ........................................ 385/88; 385/91

(58) Field of Classification Search ................. None
See application file for complete search history.

(56) References Cited

U.S. PATENT DOCUMENTS

| | | | |
|---|---|---|---|
| 6,246,813 B1* | 6/2001 | Zheng | 385/34 |
| 6,761,490 B2* | 7/2004 | Wada et al. | 385/78 |
| 2002/0039472 A1 | 4/2002 | Takeuti et al. | |
| 2002/0074086 A1* | 6/2002 | Nakamura et al. | 156/329 |
| 2003/0009733 A1 | 1/2003 | Hathaway et al. | |

FOREIGN PATENT DOCUMENTS

| | | |
|---|---|---|
| JP | 9-15449 | 1/1997 |
| JP | 9-61673 | 3/1997 |
| JP | 2002-350693 | 12/2002 |
| JP | 2003-50337 | 2/2003 |
| JP | 2003-107288 | 4/2003 |
| JP | 2003-149502 | 5/2003 |
| JP | 2003-222764 | 8/2003 |

* cited by examiner

*Primary Examiner*—Omar Rojas
(74) *Attorney, Agent, or Firm*—Wenderoth, Lind & Ponack, L.L.P.

(57) ABSTRACT

An optical receptacle comprises a precision sleeve, a stub with an optical fiber fixed to one end of an inner hole of the precision sleeve through an adhesive, and a sleeve holder fixed to an outer periphery of the precision sleeve by press-fitting or through the adhesive. An outer periphery of the stub with an optical fiber and the inner hole of the precision sleeve has a surface roughness Ra value of 0.1 μm or more and 0.5 μm or less.

20 Claims, 3 Drawing Sheets

| Surface roughness | | |
|---|---|---|
| Ra | [μm] | 0.29 |
| Ry | [μm] | 2.17 |
| Rz | [μm] | 1.70 |
| δ | [μm] | 1.05 |
| tp | [%] | 36.72 |
| Sm | [μm] | 6.75 |
| S | [μm] | 1.34 |
| RMS | [μm] | 0.36 |
| Cut | [mm] | non |

| Measurement condition | |
|---|---|
| Dark cut | : non processed |
| Bright cut | : non processed |
| Smoothing | : simple ± 2 |
| Inclination correction | : Auto |

FIG. 2(B)

| Surface roughness | | |
|---|---|---|
| Ra | [μm] | 0.30 |
| Ry | [μm] | 2.18 |
| Rz | [μm] | 1.83 |
| δ | [μm] | 1.15 |
| tp | [%] | 27.34 |
| Sm | [μm] | 7.21 |
| S | [μm] | 2.20 |
| RMS | [μm] | 0.38 |
| Cut | [mm] | non |

| Measurement condition | |
|---|---|
| Dark cut | : non processed |
| Bright cut | : non processed |
| Smoothing | : simple ± 2 |
| Inclination correction | : Auto |

OPTICAL RECEPTACLE

TECHNICAL FIELD

The present invention relates to an optical receptacle used for optically connecting a signal between an optical fiber connector and an optical receiver/optical transmitter.

BACKGROUND ART

Figure 3A:
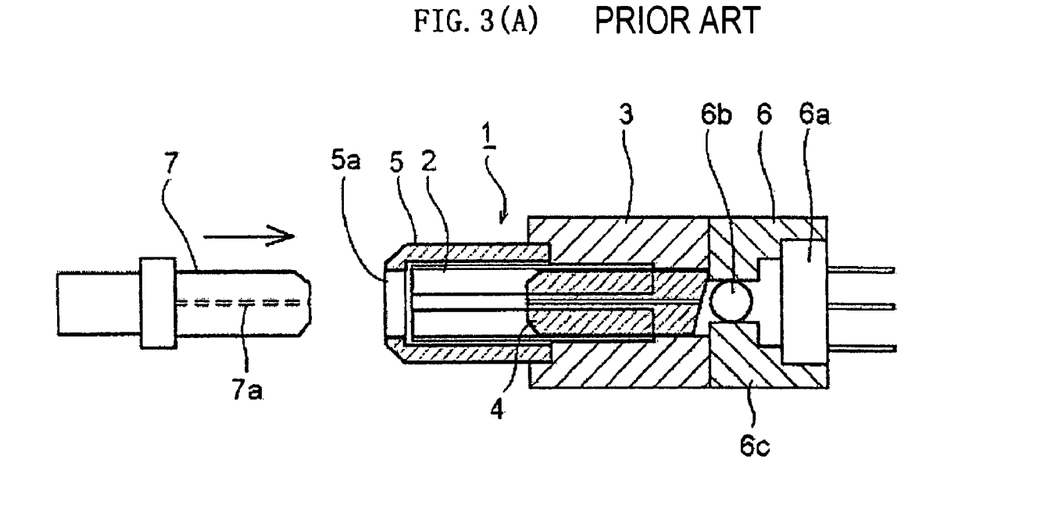
FIG. 3(A) is a main part sectional view showing a state in which an optical connector is connected to an optical receptacle using a split sleeve.

A conventional receptacle 1 as shown in FIG. 3(A) employs a split sleeve 2. In this optical receptacle 1, a stub 4 with an optical fiber is fixed to a stub holder 3 by press-fitting or through an adhesive. The stub 4 with an optical fiber is held in the split sleeve 2 having sufficient elasticity, and the split sleeve 2 is closed within a clamping allowance to hold the stub 4.

An optical connector ferrule 7 is inserted from an opening part 5a of a split sleeve cap 5 of the optical receptacle 1, and the optical connector ferrule 7 and the stub 4 are aligned precisely and concentrically by the split sleeve 2. An optical receiver/optical transmitter 6, provided with a photosemiconductor 6a, a lens 6b, and a holder 6c for holding the photosemiconductor 6a and the lens 6b, is arranged on a back side of the optical receptacle 1. The optical connector ferrule 7 and the stub 4 with an optical fiber are aligned precisely and concentrically by the split sleeve 2, to thereby connect optically the optical receiver/optical transmitter 6 and an optical fiber 7a in the optical connector ferrule 7 through the stub 4 with an optical fiber.

Figure 3B:
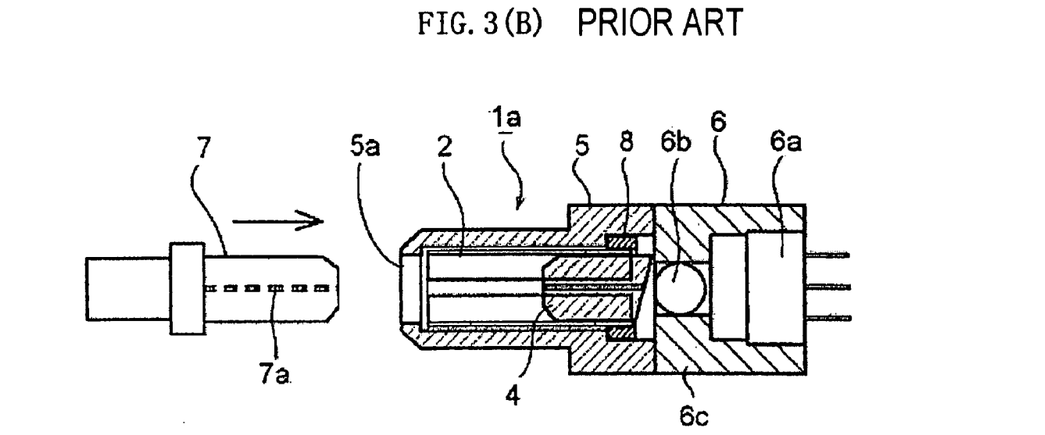
FIG. 3(B) is a main part sectional view showing a state in which an optical connector is connected to an optical receptacle reduced in size by using a holding ring together with the split sleeve.

The optical receptacle 1 shown in FIG. 3(A) is most orthodox and has an initial style devised to be connected concentrically with an optical connector by using the stub 4. Recently, reduction in size of a transmission apparatus itself is highly needed, and a reduction in length of an optical receptacle to be used for the transmission apparatus is strongly demanded. In order to achieve this reduction in length, various forms of optical receptacles are employed. For example, as shown in FIG. 3(B), Patent Document 1 (see the list below) discloses a small optical receptacle 1a constructed of four components and having a structure including a holding ring 8 press-fitted between a split sleeve 2 and a split sleeve cap 5 such that a short stub 4 with an optical fiber can be aligned precisely and concentrically so that even the short stub 4 is held strongly by the split sleeve 2 and is not loosened.

Figure 3C:
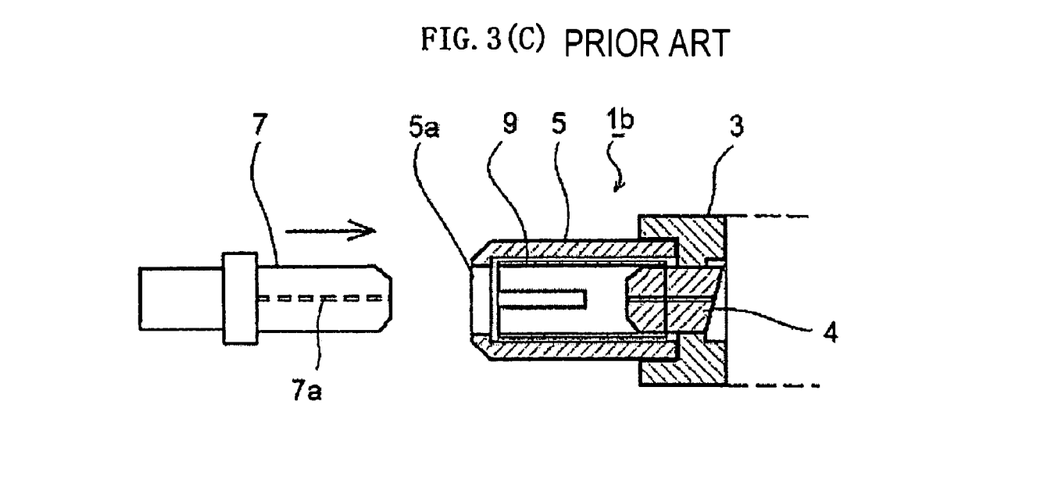
FIG. 3(C) is a main part sectional view showing a state in which an optical connector is connected to an optical receptacle reduced in size by using a sleeve which is partly split.

Further, as shown in FIG. 3(C), Patent Document 2 discloses a small optical receptacle 1b including a split sleeve 9 which is split not across the entire sleeve but is split only on a side where an optical connector ferrule 7 is inserted. It is not split on the side of a stub 4. The stub 4 is bonded and fixed to the split sleeve 9. As described above, a full length of the stub 4 with an optical fiber is reduced, and the stub 4 can be aligned precisely and concentrically. In this optical receptacle 1b, the stub 4 is fixed to a stub holder 3 by press-fitting or through an adhesive, and a special split sleeve 9 as described above is fixed to the stub 4. Further, a split sleeve cap 5 is fixed so as to cover the split sleeve 9. Thus, the optical receptacle 1b has four components in total.

Meanwhile, Patent Document 3, by the inventors of the present invention, discloses: an optical fiber capillary having an inner hole with a surface roughness Ra value of 0.1 μm to 0.5 μm for securing concentricity between the inner hole of the optical fiber capillary and an optical fiber; and a stub with an optical fiber using the optical fiber capillary.

Further, Patent Document 2 and Patent Document 4 each disclose an optical receptacle having an outer periphery surface of a ferrule and an inner periphery surface of a sleeve each with a surface roughness Ra value of 0.2 μm or less for securing an insertion property of the ferrule into the sleeve.

Patent Document 1: JP-A-10-332988
Patent Document 2: JP-A-2003-107288
Patent Document 3: JP-A-2003-149502 (US 2003095753 A1)
Patent Document 4: JP-A-2003-222764

In the conventional optical receptacle 1 described above, the stub 4 with an optical fiber is fixed to the stub holder 3, and the split sleeve 2 is used as a component for aligning the optical connector ferrule 7 and the stub 4 concentrically. However, the split sleeve 2 only holds, and does not fix, the stub 4. Thus, in order to prevent removal of the stub 4 with an optical fiber when the optical connector ferrule 7 is inserted and pulled out, the split sleeve cap 5 is required. As a result, a minimum of four components are required for constructing the optical receptacle 1. Those components are all essential elements for constructing the optical receptacle in this form, and the number of components cannot be reduced further. Thus, the conventional optical receptacle has a problem of difficulties in cost reduction.

Further, for realizing a reduction in size of an optical device, the stub 4 with an optical fiber is preferably as short as possible for mounting a high-density light guide member. However, a short stub 4 with an optical fiber reduces the holding force of the split sleeve 2. In the case where the optical connector ferrule 7 is inserted into the split sleeve 2 and a horizontal load is applied thereto, the optical connector ferrule 7 and the stub 4 with an optical fiber cannot maintain concentric alignment. An angular shift occurs between an optical axis of the short stub 4 with an optical fiber and an optical axis of the optical connector ferrule 7, and precise and concentric alignment cannot be maintained. Thus, the stub 4 with an optical fiber cannot be reduced in length further.

The optical receptacle of Patent Document 1 has achieved size reduction, but requires a holding ring 8 for reinforcement for stably maintaining a positional relationship between the optical axis of the short stub 4 with an optical fiber and the optical axis of the optical connector ferrule 7 for a single mode optical fiber. As a result, the optical receptacle has a problem in that the number of expensive components increases.

The optical receptacle of Patent Document 2 has achieved size reduction, but requires the special split sleeve 9 having a slit partway. The optical receptacle requires more complex working, and a cost increase cannot be prevented. Further, this optical receptacle requires the split sleeve cap 5 as in the conventional optical receptacle 1. Thus, the number of components cannot be reduced further.

DISCLOSURE OF THE INVENTION

An object of the present invention is to provide an optical receptacle which is capable of maintaining high precision and high reliability, which is small and has a small number of components, and which requires a low production cost.

An optical receptacle according to the present invention includes a precision sleeve, a stub with an optical fiber fixed to one end of an inner hole of the precision sleeve through an adhesive, and a sleeve holder fixed to an outer periphery of the precision sleeve by press-fitting or through an adhesive. Further, an outer periphery of the stub with an optical fiber and/or the inner hole of the precision sleeve has a surface roughness Ra value of 0.1 μm or more and 0.5 μm or less. The term "precision sleeve" as used herein refers to a tubular sleeve which is not split as in a split sleeve and which has a larger inner diameter than an outer diameter of an optical connector ferrule to be inserted. Further, the term "Ra" refers to an arithmetic average roughness defined by JIS B0601 (including the same content as that of ISO 4287) by Japanese Industrial Standard.

A surface roughness Ra value of the outer periphery of the stub with an optical fiber and/or the inner hole of the precision sleeve of 0.1 µm or less provides an adhesive with a non-uniform thickness to be applied to the outer periphery of the stub with an optical fiber and/or the inner hole of the precision sleeve. Further, the stub with an optical fiber tends to be closer to a side wall of the inner hole of the precision sleeve and to be eccentric with the precision sleeve.

Meanwhile, a surface roughness Ra value of the outer periphery of the stub with an optical fiber of more than 0.5 µm presumably increases significantly an Ry value defined as a maximum roughness in JIS B0601. A center position of a minimum circumscribed cylinder of the outer periphery often shifts from a center of a circle formed by an average line of surface roughness of the outer periphery to thereby substantially degrade the intrinsic circularity itself of the outer periphery.

In the present invention, it is important that the surface roughness Ra value of the outer periphery of the stub with an optical fiber be 0.1 µm or more and 0.5 µm or less. The Ra value is preferably more than 0.2 µm for providing stably an adhesive to be applied with a uniform thickness. Further, the surface roughness Ry value is preferably 4.0 µm or less in view of suppressing a shift of a center position of the minimum circumscribed cylinder of the outer periphery with respect to the center of the circle formed by the average line of surface roughness and enhancing circularity of the outer periphery. Further, a difference δ between an average line and a peak line of surface roughness is preferably 2.0 µm or less.

A surface roughness Ra value of the inner hole of the precision sleeve of more than 0.5 µm presumably increases significantly an Ry value defined as a maximum roughness. A center position of a maximum inscribed cylinder of the inner hole often shifts from a center of a circle formed by an average line of surface roughness of the inner hole of the precision sleeve as described above, to thereby substantially degrade the intrinsic circularity itself of the inner hole.

In the present invention, it is important that the surface roughness Ra value of the inner hole of the precision sleeve be 0.1 µm or more and 0.5 µm or less. The Ra value is preferably more than 0.2 µm for providing stably an adhesive to be applied with a uniform thickness. Further, the surface roughness Ry value is preferably 4.0 µm or less in view of suppressing a shift of a center position of the maximum inscribed cylinder of the inner hole with respect to the center of the circle formed by the average line of surface roughness and enhancing circularity of the inner hole. Further, a difference δ between an average line and a peak line of surface roughness is preferably 2.0 µm or less.

The outer periphery or inner hole with such a surface roughness can be achieved by controlling the size or amount of material particles for the stub with an optical fiber or the precision sleeve. Further, the surface roughness Ra value of the outer periphery of the stub with an optical fiber can be adjusted to 0.1 µm or more and 0.5 µm or less by mechanical working.

A metal or a resin can be used as a material for the sleeve holder. In particular, the sleeve holder is preferably formed of stainless steel or other metal materials each having desired rigidity, shape stability, and weatherability. An optical receiver/optical transmitter component to be arranged on a back side of the optical receptacle is often formed of metal, and thus the sleeve holder is more preferably formed of SUS304 or SUS430 in consideration of weldability and the like.

In the present invention, a concentricity of a core of an optical fiber with respect to the outer periphery of the stub with an optical fiber is preferably 0.5 µm or less.

A concentricity of more than 0.5 µm may cause a shift of an optical axis of the optical fiber held in the inner hole of the precision sleeve holding the outer periphery of the stub with an optical fiber by 0.5 µm or more from the center of the inner hole of the precision sleeve. This shift in the optical axis and other accumulating eccentric factors prevent alignment of an optical axis of the stub with an optical fiber and an optical axis of an optical connector ferrule for a single mode optical fiber to be connected thereto at a practical level.

In the present invention, the inner hole of the precision sleeve preferably has a larger inner diameter by 0 to 1.5 µm than an outer diameter of the optical fiber connector ferrule.

A rigid precision sleeve having a smaller inner diameter than an outer diameter of the optical fiber connector ferrule has insufficient elasticity and no split, and thus the optical fiber connector ferrule cannot be inserted thereinto. For preventing increase in connection loss, a difference between the outer diameter of the optical connector ferrule and the inner diameter of the inner hole of the precision sleeve is preferably small. The inner diameter of the inner hole of the precision sleeve is preferably larger than the outer diameter of the optical fiber connector ferrule. A difference therebetween of 0 to 1.5 µm provides an axial shift of 0.5 µm or less between a fiber core of the stub with an optical fiber and an optical fiber core of the optical fiber connector ferrule, to thereby achieve more stable connection characteristics.

A capillary forming the stub with an optical fiber is preferably formed of crystallized glass. The capillary preferably has the same accuracy of dimensions such as outer diameter, inner diameter, and concentricity as that of the optical connector ferrule to be opposed and connected to the stub with an optical fiber.

The crystallized glass is most suitable as a material for a capillary of the stub with an optical fiber or the precision sleeve of the present invention. In the case where the capillary of the stub with an optical fiber or the precision sleeve is formed of crystallized glass, the surface roughness can be adjusted by mechanical working or can be controlled freely by adjusting material composition, heat treatment temperature, and the like. The crystallized glass to be used in the present invention may be crystallized glass having a crystal grain size or crystal amount providing the outer periphery of the capillary with a surface roughness Ra value of 0.1 µm or more and 0.5 µm or less. For example, crystallized glass preferably has a crystal grain size of about 0.1 µm to 1.0 µm and a crystal amount of 30 to 70 mass % (vol %).

In the present invention, the precision sleeve may be formed of glass or crystallized glass.

In the case where the precision sleeve is formed of a glass or crystallized glass material, dimensions of the precision sleeve are not adjusted by mechanical working. The precision sleeve can be produced through a draw forming technique and thus is suitable in view of cost reduction through mass production. The precision sleeve formed of glass can be produced through draw forming of a wide range of compositions and thus is advantageous in the case where a thermal expansion coefficient must be adjusted. The precision sleeve formed of crystallized glass allows forming and adjustment of the surface roughness at the same time, and thus the crystallized glass is the most preferred material. Meanwhile, crystallized glass to be used for the precision sleeve of the present invention may be crystallized glass which precipitates crystals providing an inner hole with a surface roughness Ra value of 0.1 μm or more and 0.5 μm or less. In particular, the crystallized glass is preferably crystallized glass which precipitates main crystals having a crystal grain size of about 0.1 μm to 1.0 μm in amorphous glass. For example, the crystallized glass preferably contains as main crystals a β-spodumene solid solution and the like.

In the optical receptacle of the present invention, the adhesive preferably contains 10 vol % or more of fillers having a maximum particle size of 0.5 μm or less and an average particle size of 0.3 μm or less.

The fillers themselves, having a maximum particle size of 0.5 μm or more or an average particle size of 0.3 μm or more, cannot be uniformly filled into a gap between the precision sleeve and the stub with an optical fiber. In the case where the stub with an optical fiber is narrowed to provide a large gap between the precision sleeve and the stub with an optical fiber, the thickness of an adhesive layer itself becomes too thick. The stub with an optical fiber is hardly held at the center position of the inner hole of the precision sleeve. Further, a large amount of the adhesive may degrade reliability such as weatherability and optical stability. A mixing ratio of the fillers of 10 vol % or less hardly sufficiently suppresses effects of volume shrinkage of the adhesive during curing or expansion and shrinkage thereof associated with temperature change. Note that an epoxy resin adhesive to be used for assembly causes volume shrinkage of about 20% during curing. For preventing a shift in position of the stub with an optical fiber due to shrinkage of the adhesive, fillers formed of glass, ceramics, metal, or the like and having a maximum particle size of 0.5 μm or less and an average particle size of 0.3 μm or less are effectively mixed into the adhesive. Mixing of the fillers imparts a thixotropic property and has a preventing effect on dripping or an increasing effect on strength of the adhesive.

The optical receptacle of the present invention includes a precision sleeve, a stub with an optical fiber fixed to one end of an inner hole of the precision sleeve through an adhesive and a sleeve holder fixed to an outer periphery of the precision sleeve by press-fitting or through an adhesive. An outer periphery of the stub with an optical fiber and/or the inner hole of the precision sleeve has a surface roughness Ra value of 0.1 μm or more and 0.5 μm or less. Thus, the adhesive spreads uniformly across the outer periphery of the stub with an optical fiber in the precision sleeve owing to properties of the surface having such a surface roughness, and the stub with an optical fiber can be positioned at the center of the precision sleeve. The stub with an optical fiber can be held stably and more accurately at the center of the precision sleeve through a layer of an adhesive having a uniform thickness than a conventional optical receptacle. Thus, an optical receptacle having a small loss and being sufficiently practical can be constructed without the use of a split sleeve. Each of the members is fixed through the adhesive, and a conventional loose split cap with a gap is not required. The number of components is reduced, to thereby provide a more inexpensive optical receptacle.

Each of the members is fixed more strongly than the holding force of the split sleeve through the adhesive. The full length of the stub with an optical fiber can be reduced easily without degrading its properties. Further, a special member such as a holding ring for reinforcement is not additionally required as in the split sleeve type.

A construction in which the precision sleeve has an inner hole with a surface roughness Ra value of 0.1 μm or more and 0.5 μm or less is employed to thereby stably hold and fix the stub with an optical fiber at the center position of the precision sleeve through a layer of an adhesive with a uniform thickness.

Preferably, the concentricity of a core of the optical fiber is 0.5 μm or less with respect to the outer periphery of the stub with an optical fiber for suppressing loss of optical signals transmitting through the optical receptacle. More preferably, the inner hole of the precision sleeve has a larger inner diameter by 0 to 1.5 μm than the outer diameter of the optical fiber connector ferrule.

The capillary of the stub with an optical fiber is formed of crystallized glass to provide a devised composition, to thereby obtain easily a capillary with highly accurate dimensions through draw forming. A state of crystal precipitation is controlled, to thereby obtain easily a capillary having an outer periphery with a surface roughness Ra value of 0.1 μm or more and 0.5 μm or less.

The precision sleeve is formed of glass or crystallized glass to provide a devised composition, to thereby obtain easily desired shape and dimensions through draw forming. In the case where crystallized glass is used, a state of crystal precipitation is controlled, to thereby obtain easily a precision sleeve having an inner hole with a surface roughness Ra value of 0.1 μm or more and 0.5 μm or less.

Further, a construction in which the adhesive contains 10 vol % or more of fillers having a maximum particle size of 0.5 μm or less and an average particle size of 0.3 μm or less is employed to thereby form easily and uniformly an adhesive layer between the precision sleeve and the stub with an optical fiber in a circumferential direction and hold stably and more easily the stub with an optical fiber at the center of the precision sleeve.

The stub with an optical fiber is self-aligned and bonded and fixed in the inner hole of the precision sleeve having the desired rigidity, to thereby arrange the stub with an optical fiber and the optical connector ferrule highly precisely and concentrically with hardly any deformation when the optical connector ferrule is inserted into the stub with an optical fiber. Thus, in the optical receptacle of the present invention, the stub with an optical fiber may be as short as possible without degrading performance, and the optical receptacle then allows high density mounting.

The above-mentioned optical receptacle of the present invention has high precision and high reliability, is small, has a small number of components, and requires a low production cost.

BRIEF DESCRIPTION OF THE DRAWINGS

FIG. 3 each show a conventional optical receptacle.

BEST MODE FOR CARRYING OUT THE INVENTION

Hereinafter, an embodiment of the present invention will be described in detail with reference to FIG. 1. In FIG. 1: reference numerals 11 and 21 each represent an optical receptacle; reference numerals 12 and 22 each represent a precision sleeve; reference numerals 12a and 22a each represent an inner hole; reference numerals 13 and 23 each represent a sleeve holder formed of metal; reference numeral 14 represents a stub with an optical fiber; reference numeral 15 represents an optical connector ferrule; and reference numeral 16 represents an adhesive.

A connection loss at a connection part between an optical connector ferrule and a stub with an optical fiber, that is, Loss (unit: dB), is determined by an axial shift between cores of the respective optical fibers on opposing end surfaces and can be estimated by means of the following mathematical expression 1. In the mathematical expression 1, d represents an axial shift between the cores of the respective optical fibers, and w represents a mode field diameter of the optical fiber.

$$\text{Loss} = 4.34\{d/(w/2)\}^2 \qquad \text{mathematical expression 1}$$

In a conventional optical receptacle, a concentricity between an outer periphery of a stub with an optical fiber or optical connector ferrule and a core of an optical fiber in an inner hole of the stub with an optical fiber or optical connector ferrule is 1.0 µm at maximum. That is, an eccentricity of the core of the optical fiber is 0.5 µm, which is half of the concentricity, and the core of the optical fiber itself has a very small eccentricity. If the eccentricity of the core of the optical fiber is neglected, the eccentricity of an inner hole of the optical fiber in the stub with an optical fiber or inner hole of the optical connector ferrule is 0.5 µm at maximum, and an axial shift at a connection part is 2.0 µmat maximum. Thus, a connection loss (that is, Loss) obtained by using the mathematical expression 1 at a mode field diameter w=10 µm is about 0.7 dB. In the case where a split sleeve is used, concentric alignment is achieved by its holding force alone. If the stub with an optical fiber is reduced in length for reduction in size of the optical receptacle, the holding force of the split sleeve degrades and concentric alignment cannot be maintained under application of a horizontal load. Thus, the connection loss will increase further than the calculated value.

Figure 1A:
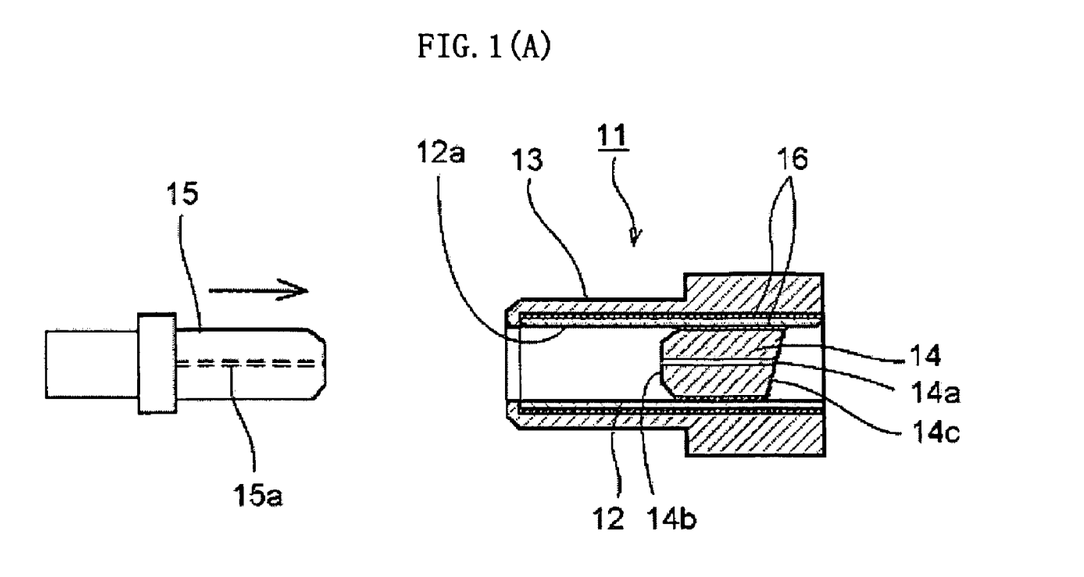
FIG. 1(A) is a main part sectional view showing a state in which an optical connector is connected to an optical receptacle using a precision sleeve formed of crystallized glass or glass.

In the optical receptacle 11 according to this embodiment, the inner hole 12a of the precision sleeve 12 and/or the outer periphery of the stub 14 with an optical fiber has the above-mentioned surface roughness. Thus, the adhesive 16 present therebetween has a uniform thickness. When a difference between an outer diameter of the stub 14 with an optical fiber and an inner diameter of the inner hole 12a of the precision sleeve 12 is 1.5 µm, for example, a self-aligning effect of the adhesive provides the eccentricity of 0.75 µm of the outer periphery of the optical connector ferrule 15 in the precision sleeve 12 and the concentricity of 0.5 µm of the capillary 14b of the stub 14 with an optical fiber. Thus, the eccentricity of the inner hole of the stub 14 with an optical fiber is 0.25 µm with respect to the outer periphery thereof. The concentricity of the inner hole of the optical connector ferrule 15 is generally 1.0 µm with respect to the outer periphery thereof, and thus the eccentricity is 0.5 µm. Further, the eccentricity of the optical fiber 15a in the inner hole of the optical connecter ferrule 15 is 0.5 µm. Thus, a sum of eccentricity is 2.0 µm. In this example, a maximum axial shift at a connection part between the optical connector ferrule 15 and the stub 14 with an optical fiber is 2.0 µm, and the maximum connection loss is 0.7 dB from the above-mentioned mathematical expression 1. Thus, the optical receptacle 11 according to this embodiment has similar performance to that of a conventional optical receptacle and is sufficiently practical. In the case where the precision sleeve 12 is used, concentric alignment is guaranteed by dimensional accuracy, and thus similar performance to that described above can be maintained even if the stub with an optical fiber is reduced in length for size reduction of the optical receptacle.

Figure 1B:
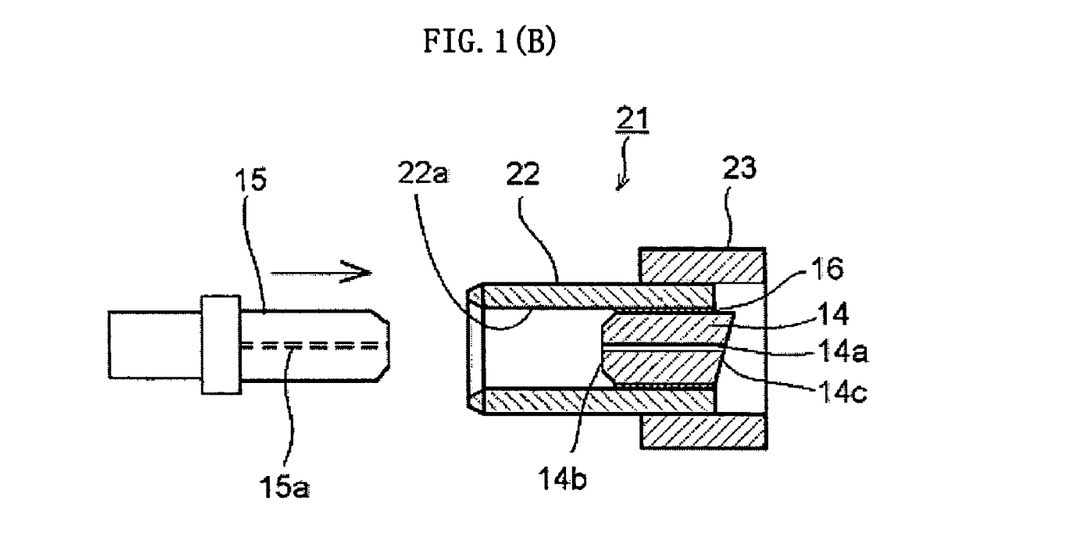
FIG. 1(B) is a main part sectional view showing a state in which an optical connector is connected to an optical receptacle using a precision sleeve formed of crystallized glass and press-fitted into a sleeve holder.

Further, the optical receptacle 21 according to another embodiment shown in FIG. 1(B) is obtained by fixing the precision sleeve 22 formed of crystallized glass and having the inner hole 22a with a surface roughness Ra value of 0.1 µm or more and 0.5 µm or less into the short sleeve holder 23 through press-fitting.

EXAMPLE 1

A stub with an optical fiber and a precision sleeve were each formed from crystallized glass having a composition shown in Table 1 below.

TABLE 1

| | | Sample No. | | | | |
|---|---|---|---|---|---|---|
| | | 1 | 2 | 3 | 4 | 5 |
| Glass composition (Mass %) | SiO$_2$ | 57.8 | 66.3 | 67.4 | 64.3 | 65.9 |
| | Al$_2$O$_3$ | 24.6 | 18.2 | 16.6 | 18.0 | 18.2 |
| | Li$_2$O | 2.7 | 2.3 | 2.3 | 2.5 | 2.0 |
| | K$_2$O | 7.0 | 3.4 | 3.5 | 5.0 | 3.4 |
| | TiO$_2$ | 2.8 | 1.8 | 3.0 | 3.0 | 1.5 |
| | ZrO$_2$ | 3.2 | 1.8 | 1.8 | 2.0 | 1.8 |
| | ZnO | 1.0 | 3.1 | 2.0 | 3.1 | 3.6 |
| | MgO | — | 1.0 | 1.0 | 1.0 | 1.5 |
| | CaO | — | — | — | 0.4 | 0.6 |
| | BaO | — | — | — | 0.5 | 1.4 |
| | B$_2$O$_3$ | — | — | 2.0 | — | — |
| | Na$_2$O | 0.4 | — | — | — | — |
| | P$_2$O$_5$ | — | — | 0.4 | — | — |
| | As$_2$O$_3$ | 0.5 | — | — | 0.2 | 0.1 |
| | Bi$_2$O$_3$ | — | 2.1 | — | — | — |
| Crystallization conditions (° C.) | | | | | | |

TABLE 1-continued

|  | Sample No. | | | | |
| --- | --- | --- | --- | --- | --- |
|  | 1 | 2 | 3 | 4 | 5 |
| Nucleation temperature | 780 | 780 | 790 | 780 | 780 |
| Crystal growth temperature | 1000 | 1000 | 980 | 1050 | 1000 |
| Main crystals | β-Quartz solid solution | β-Spodumene solid solution | β-Spodumene solid solution | β-Spodumene solid solution | β-Spodumene solid solution |

As shown in FIG. 1(A), the optical receptacle 11 of Example included: the precision sleeve 12 formed of crystallized glass and having an inner hole with a larger inner diameter by 0 to 1.5 μm than an outer diameter of the optical connector ferrule 15; and the stub 14 with an optical fiber inserted into one end of the inner hole 12a of the precision sleeve 12 and bonded and fixed thereto through the adhesive 16. The stub 14 with an optical fiber was prepared by inserting and bonding the optical fiber 14a into the inner hole of the capillary 14b formed of crystallized glass. An end face 14c of the stub 14 with an optical fiber was subjected to polishing to be at an angle of 8° with respect to a plane perpendicular to an incident axis of optical signals such that reflected light did not enter a laser diode or the like and produce noise. An end surface on an opposite side was beveled on its circumference and polished to have a convex spherical surface with a core of the optical fiber 14a at the center for PC (abbreviation for physical contact) connection. The concentricity of the inner hole of the stub 14 with an optical fiber was 0.5 μm or less with respect to the outer periphery thereof. The eccentricity of the core of the optical fiber 14a itself was very small to be neglected, and the stub 14 with an optical fiber was self-aligned by the adhesive in the inner hole. Thus, the concentricity between the outer periphery of the stub 14 with an optical fiber and the core of the optical fiber 14a was 0.5 μm or less. The outer periphery of the stub 14 with an optical fiber had the same outer diameter and tolerance as those of the optical connector ferrule 15 (outer diameter of 2.499 mm+/−0.0005 mm, or outer diameter of 1.249 mm+/−0.0005 mm).

Figure 2A:
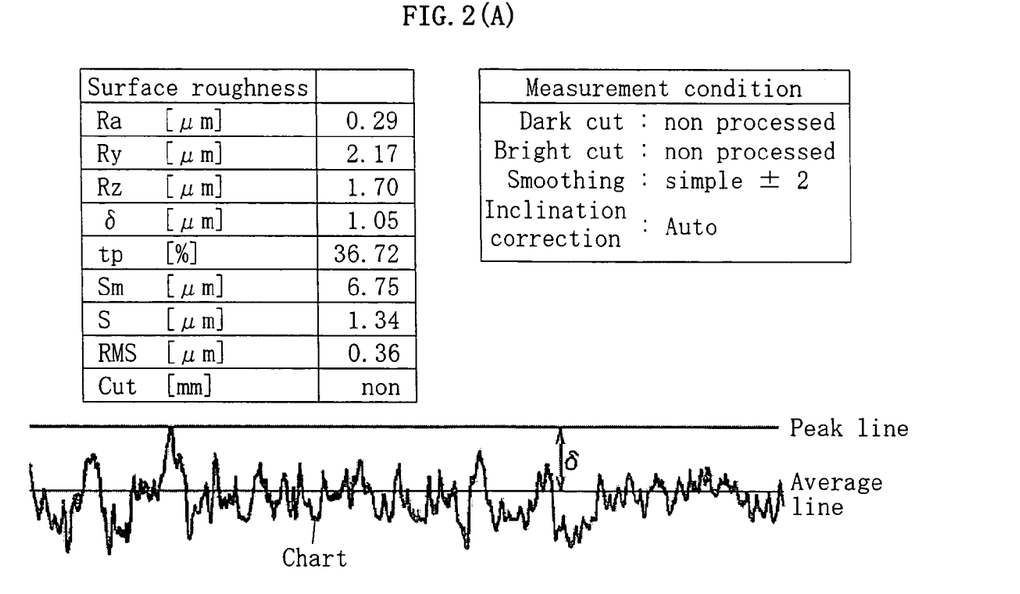
FIG. 2(A) is a chart obtained by measuring a surface roughness of an outer periphery of a stub with an optical fiber.
Figure 2B:
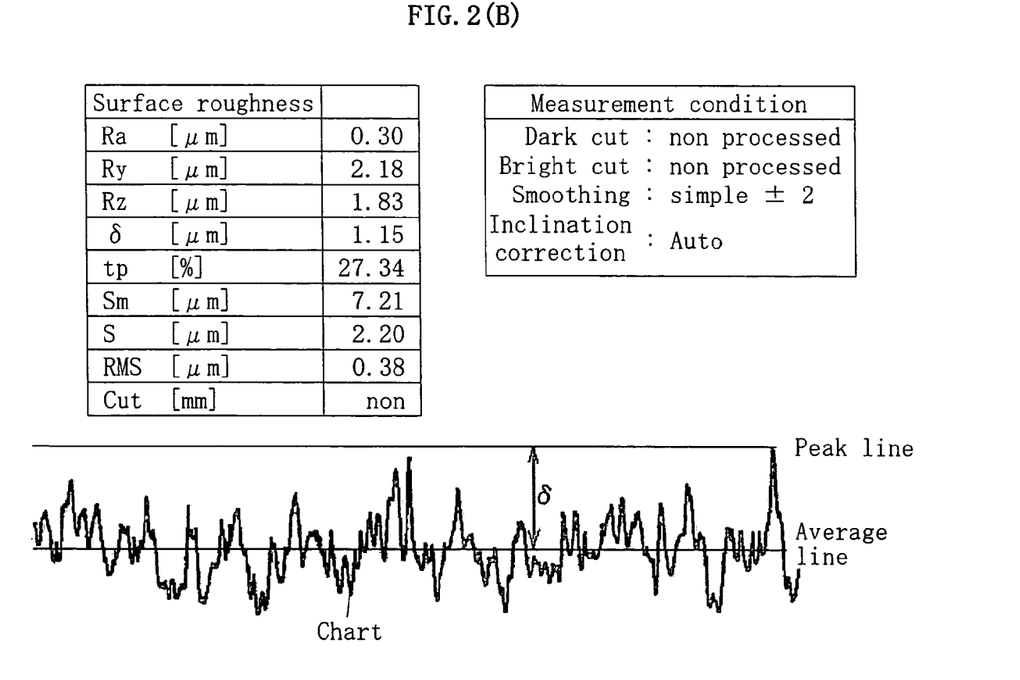
FIG. 2(B) is a chart obtained by measuring a surface roughness of an inner hole of a precision sleeve.

FIG. 2(A) is a chart obtained by measuring a surface roughness of the outer periphery of the stub 14 with an optical fiber. The outer periphery of the stub 14 with an optical fiber had: an Ra value of 0.29 μm; an Ry value of 2.17 μm; and a difference δ between an average line and a peak line of surface roughness of 1.05 μm. FIG. 2(B) is a chart obtained by measuring a surface roughness of the inner hole 12a of the precision sleeve 12. The inner hole 12a of the precision sleeve 12 had: an Ra value of 0.30 μm; an Ry value of 2.19 μm; and a difference δ between an average line and a peak line of surface roughness of 1.15 μm.

In the case where the inner hole of the capillary 14b forming the stub 14 with an optical fiber had a surface roughness Ra value of 0.1 μm or more and 0.5 μm or less, the optical fiber 14a was self-aligned in the inner hole of the capillary 14b through the adhesive by the effect of surface roughness, and the eccentricity of the optical fiber 14a in the inner hole of the capillary 14b was neglected. Thus, the eccentricity of the core of the optical fiber 14a in the stub 14 with an optical fiber was determined by the concentricity of 0.5 μm of the inner hole of the capillary 14b of the stub 14 with an optical fiber with respect to the outer periphery thereof alone. Thus, the core of the optical fiber 14a in the stub 14 with an optical fiber had a concentricity of 0.5 μm or less and an eccentricity of 0.25 μm or less. For example, the core of the optical fiber 14a in the stub 14 with an optical fiber had an eccentricity of 0.175 μm.

In the optical receptacle 11 of Example 1, the outer periphery of the stub 14 with an optical fiber and the inner hole 12a of the precision sleeve 12 had the above-mentioned surface roughness Ra values. The stub 14 with an optical fiber was self-aligned in the inner hole 12a of the precision sleeve 12 through the adhesive 16 by the effect of surface roughness, and thus the stub 14 with an optical fiber in the inner hole 12a of the precision sleeve 12 had nearly no eccentricity.

The precision sleeve 12 and the capillary 14b of the stub 14 with an optical fiber were each formed of crystallized glass, to thereby adjust easily the surface roughness Ra values of the inner hole 12a of the precision sleeve 12 and the outer periphery of the stub 14 with an optical fiber to 0.1 μm or more and 0.5 μm and less. As described above, the stub 14 with an optical fiber was aligned in the inner hole 12a of the precision sleeve 12 by the effect of surface roughness, and was positioned at the center of the inner hole 12a. Thus, an axial shift at a connection part between the core of the optical fiber 14a and the core of the optical fiber 15a was 2.0 μm at maximum, and a connection loss of 0.7 dB or less was achieved. The optical receptacle employing even a short stub 14 with an optical fiber provided similar performance to that of a conventional optical receptacle.

In the case where the optical connector ferrule 15 was formed of crystallized glass and its inner hole had a surface roughness Ra value of 0.1 μm or more and 0.5 μm or less, the optical fiber 15a was self-aligned in the inner hole of the optical connector ferrule 15 by the effect of surface roughness. Thus, an axial shift at a connection part between the core of the optical fiber 14a and the core of the optical fiber 15a was 1.5 μm at maximum, and a connection loss of 0.4 dB or less was achieved. The optical receptacle had better properties than those of the conventional optical receptacle.

EXAMPLE 2

The precision sleeve 12 formed of crystallized glass having the inner hole 12a with a surface roughness Ra value of 0.3 μm, an outer diameter of 1.80 mm, and an inner diameter of 1.2495+0.0005/−0 mm was produced. Further, the optical fiber 14a was inserted and bonded to the capillary 14b formed of crystallized glass having the inner hole and outer periphery with a surface roughness Ra value of 0.3 μm, an outer diameter of 1.2490+/−0.0005 mm, and a concentricity of 0.5 μm, to thereby produce the stub 14 with an optical fiber. The stub 14 with an optical fiber was fixed to the inner hole 12a of the precision sleeve 12 through the epoxy-based adhesive 16, and the precision sleeve 12 was fixed to the inner hole of the sleeve holder 13 through the epoxy-based adhesive 16, to thereby produce the optical receptacle 11. Ten samples of optical receptacles 11 were produced. The optical connector ferrule 15 was inserted into the inner hole 12a of the precision sleeve 12 of each optical receptacle 11 thus produced so as to oppose the stub 14 with an optical fiber 14. Then, the core of the optical fiber 14a and the core of the optical fiber 15a were subjected to PC (abbreviation for physical contact) connection and a connection loss in the state was measured. Each sample of the optical receptacle 11 was measured for connection loss by attaching and detaching the optical connector ferrule 15 ten times and measuring the connection loss ten times.

In a state where the optical connector ferrule 15 was connected to the optical receptacle 11, a difference between the outer diameter of the optical connector ferrule 15 and the inner diameter of the inner hole 12a of the precision sleeve 12 was 1.5 μm at maximum, and the eccentricity of the optical connector ferrule 15 in the inner hole 12a of the precision sleeve 12 was 0.75 μm at maximum. The eccentricity of 0.25 μm of the center of the inner hole of the capillary 14b of the stub 14 with an optical fiber with respect to the center of the outer periphery thereof was added thereto. The maximum axial shift at a PC connection part of (1.0+X+Y) μm was obtained by adding the eccentricity X μm of the center of the inner hole of the optical connector ferrule 15 with respect to the center of the outer periphery thereof to the eccentricity Y μm of the optical fiber 15a in the inner hole of the optical connector ferrule 15. The stub 14 with an optical fiber was aligned by the effect of surface roughness described above in the inner hole 12a of the precision sleeve 12, and the eccentricity of the stub 14 with an optical fiber in the inner hole 12a of the precision sleeve 12 need not be taken into consideration.

The optical connector ferrule 15 was formed of crystallized glass and had a concentricity of 0.7 μm, and its inner hole had a larger inner diameter by 0.5 μm than a diameter of the optical fiber 15a, to thereby provide excellent properties of an average connection loss of 0.14 dB and a maximum connection loss of 0.31 dB. Table 2 shows the measurement data.

TABLE 2

Sample: Crystallized glass sleeve + Crystallized glass stub + Crystallized glass ferrule

| Number of measurements | Average connection loss (dB) | Maximum connection loss (dB) | Standard deviation (dB) |
|---|---|---|---|
| 10 | 0.14 | 0.31 | 0.10 |

The results of the measurement and the mathematical expression 1 described above provided an average axial shift of 0.9 μm and a maximum axial shift of 1.34 μm between the core of the optical fiber 14a and the core of the optical fiber 15a. In this case, the eccentricity X of the inner hole obtained from the concentricity of the optical connector ferrule 15 was 0.35 μm, and the eccentricity Y of the optical fiber 15a in the inner hole of the optical connector ferrule 15 was substantially 0 because the optical connector ferrule 15 was formed of crystallized glass. A theoretical maximum axial shift was 1.35 μm. The effect of Example 2 was significant because the axial shift was suppressed to 1.35 μm even at maximum.

In addition, the optical connector ferrule 15 was formed of zirconia and had a concentricity of 1.0 μm, and its inner hole had a larger inner diameter by 0.5 μm than a diameter of the optical fiber 15a, to thereby provide properties of an average connection loss of 0.25 dB and a maximum connection loss of 0.43 dB. Table 3 shows the measurement data.

TABLE 3

Sample: Crystallized glass sleeve + Crystallized glass stub + Zirconia ferrule

| Number of measurements | Average connection loss (dB) | Maximum connection loss (dB) | Standard deviation (dB) |
|---|---|---|---|
| 10 | 0.25 | 0.43 | 0.12 |

The results of the measurement and the mathematical expression 1 described above provided an average axial shift of 1.2 μm and a maximum axial shift of 1.57 μm between the core of the optical fiber 14a and the core of the optical fiber 15a. In this case, the eccentricity X of the inner hole obtained from the concentricity of the optical connector ferrule 15 was 0.5 μm, and the eccentricity Y of the optical fiber 15a in the inner hole of the optical connector ferrule 15 was 0.25 μm. A theoretical maximum axial shift was 1.75 μm. The effect of Example 2 was significant because the axial shift was suppressed to 1.75 μm even at maximum.

EXAMPLE 3

The precision sleeve 12 formed of borosilicate glass having an outer diameter of 1.80 mm and an inner diameter of 1.2495+0.001/−0 mm was produced. Further, the optical fiber 14a was inserted and bonded to the capillary 14b formed of crystallized glass having the inner hole and outer periphery with a surface roughness Ra value of 0.3 μm, an outer diameter of 1.2490+/−0.0005 mm, and a concentricity of 0.5 μm, to thereby produce the stub 14 with an optical fiber. The stub 14 with an optical fiber was fixed to the inner hole 12a of the precision sleeve 12 through the epoxy-based adhesive 16, and the precision sleeve 12 was fixed to the inner hole of the sleeve holder 13 through the epoxy-based adhesive 16, to thereby produce the optical receptacle 11. Ten samples of optical receptacles 11 were produced. The optical connector ferrule 15 was inserted into the inner hole 12a of the precision sleeve 12 of each optical receptacle 11 thus produced so as to oppose the stub 14 with an optical fiber 14. Then, the core of the optical fiber 14a and the core of the optical fiber 15a were subjected to PC connection and a connection loss in the state was measured. Each sample of the optical receptacle 11 was measured for connection loss by attaching and detaching the optical connector ferrule 15 ten times and measuring the connection loss ten times.

In a state where the optical connector ferrule 15 was connected to the optical receptacle 11, a difference between the outer diameter of the optical connector ferrule 15 and the inner diameter of the inner hole 12a of the precision sleeve 12 was 2.00 μm at maximum, and the eccentricity of the optical connector ferrule 15 in the inner hole 12a of the precision sleeve 12 was 1.00 μm at maximum. The eccentricity of 0.25 μm of the center of the inner hole of the capillary 14b of the stub 14 with an optical fiber with respect to the center of the outer periphery thereof was added thereto. The maximum axial shift at a PC connection part of (1.25+X+Y) μm was obtained by adding the eccentricity X μm of the center of the inner hole of the optical connector ferrule 15 with respect to the center of the outer periphery thereof to the eccentricity Y μm of the optical fiber 15a in the inner hole of the optical connector ferrule 15. The stub 14 with an optical fiber was aligned by the effect of surface roughness described above in the inner hole 12a of the precision sleeve 12, and the eccentricity of the stub 14 with an optical fiber in the inner hole 12a of the precision sleeve 12 need not be taken into consideration.

The optical connector ferrule 15 was formed of crystallized glass and had a concentricity of 0.7 μm, to thereby provide excellent properties of an average connection loss of 0.18 dB and a maximum connection loss of 0.35 dB. Table 4 shows the measurement data.

TABLE 4

Sample: Glass sleeve + Crystallized glass stub + Crystallized glass ferrule

| Number of measurements | Average connection loss (dB) | Maximum connection loss (dB) | Standard deviation (dB) |
|---|---|---|---|
| 10 | 0.18 | 0.35 | 0.09 |

The results of the measurement and the mathematical expression 1 described above provided an average axial shift of 1.02 μm and a maximum axial shift of 1.42 μm between the core of the optical fiber 14a and the core of the optical fiber 15a. In this case, the eccentricity X of the inner hole obtained from the concentricity of the optical connector ferrule 15 was 0.35 μm, and the eccentricity Y of the optical fiber 15a in the inner hole of the optical connector ferrule 15 was substantially 0 because the optical connector ferrule 15 was formed of crystallized glass. A theoretical maximum axial shift was 1.60 μm. The effect of Example 3 was significant because the axial shift was suppressed to 1.60 μm even at maximum.

In addition, the optical connector ferrule 15 was formed of zirconia and had a concentricity of 1.0 μm, to thereby provide properties of an average connection loss of 0.25 dB and a maximum connection loss of 0.50 dB. Table 5 shows the measurement data.

TABLE 5

Sample: Glass sleeve + Crystallized glass stub + Zirconia ferrule

| Number of measurements | Average connection loss (dB) | Maximum connection loss (dB) | Standard deviation (dB) |
|---|---|---|---|
| 10 | 0.25 | 0.50 | 0.13 |

The results of the measurement and the mathematical expression 1 described above provided an average axial shift of 1.20 μm and a maximum axial shift of 1.70 μm between the core of the optical fiber 14a and the core of the optical fiber 15a. In this case, the eccentricity X of the inner hole obtained from the concentricity of the optical connector ferrule 15 was 0.50 μm, and the eccentricity Y of the optical fiber 15a in the inner hole of the optical connector ferrule 15 was 0.25 μm. A theoretical maximum axial shift was 2.00 μm. The effect of Example 3 was significant because the axial shift was suppressed to 2.00 μm even at maximum.

EXAMPLE 4

An adhesive mixed with fillers having an average particle size of 0.3 μm and a maximum particle size of 0.5 μm was used as the adhesive 16 for bonding the stub 14 with an optical fiber and the precision sleeve 12. In addition, the optical connector ferrule 15 was formed of crystallized glass and had a concentricity of 0.7 μm. A connection loss was measured as in the manner described above to thereby provide excellent properties of an average connection loss of 0.15 dB and a maximum connection loss of 0.31 dB. Table 6 shows the measurement data.

TABLE 6

Sample: Glass sleeve + Crystallized glass stub + Fillers in adhesive

| Number of measurements | Average connection loss (dB) | Maximum connection loss (dB) | Standard deviation (dB) |
|---|---|---|---|
| 10 | 0.15 | 0.31 | 0.09 |

The results of the measurement and the mathematical expression 1 described above provided an average axial shift of 0.93 μm and a maximum axial shift of 1.34 μm between the core of the optical fiber 14a and the core of the optical fiber 15a. In this case, the eccentricity X of the inner hole obtained from the concentricity of the optical connector ferrule 15 was 0.35 μm, and the eccentricity Y of the optical fiber 15a in the inner hole of the optical connector ferrule 15 was substantially 0 because the optical connector ferrule was formed of crystallized glass. A theoretical maximum axial shift was 1.35 μm. The effect of Example 4 was significant because the axial shift was suppressed to 1.35 μm even at maximum.

Note that the adhesive 16 containing fillers had the following effects together with the self-aligning effect. That is, the adhesive provided a preventing effect on degradation of fixing strength by adjusting a mixing ratio of the fillers to have the same thermal expansion as that of the stub 14 with an optical fiber formed of crystallized glass etc. or the precision sleeve 12 formed of borosilicate glass etc. to be bonded, and an enhancing effect on reliability for a long period of time by improving water resistance of a bonded part.

The invention claimed is:

1. An optical receptacle comprising:
   a precision sleeve;
   a stub provided with an optical fiber, said stub being fixed only to an inner hole of the precision sleeve, and said stub being fixed to one end of said inner hole of the precision sleeve through an adhesive; and
   a sleeve holder fixed to an outer periphery of the precision sleeve by press-fitting or through an adhesive, wherein
   at least one of an outer periphery of the stub and the inner hole of the precision sleeve has a surface roughness Ra value of 0.1 μm or more and 0.5 μm or less.

2. An optical receptacle according to claim 1, wherein the outer periphery of the stub with an optical fiber and/or the inner hole of the precision sleeve has a surface roughness Ra value of more than 0.2 μm and a surface roughness Ry value of 4.0 μm or less, and a difference between an average line and a peak line of surface roughness is 2.0 μm or less.

3. An optical receptacle according to claim 1, wherein a core of the optical fiber has a concentricity of 0.5 μm or less with respect to the outer periphery of the stub with an optical fiber.

4. An optical receptacle according to claim 1, wherein the inner hole of the precision sleeve has a larger inner diameter by 0 to 1.5 μm than an outer diameter of an optical fiber connector ferrule.

5. An optical receptacle according to claim 1, wherein a capillary of the stub with an optical fiber is formed of crystallized glass.

6. An optical receptacle according to claim 1, wherein the precision sleeve is formed of glass or crystallized glass.

7. An optical receptacle according to claim 5, wherein the crystallized glass has a crystal grain size of 0.1 µm to 1.0 µm, and the crystallized glass contains crystals in an amount of 30 to 70 mass %.

8. An optical receptacle according to claim 1, wherein the adhesive contains 10 vol % or more of fillers having a maximum particle size of 0.5 µm or less and an average particle size of 0.3 µm or less.

9. An optical receptacle according to claim 2, wherein a core of the optical fiber has a concentricity of 0.5 µm or less with respect to the outer periphery of the stub with an optical fiber.

10. An optical receptacle according to claim 2, wherein the inner hole of the precision sleeve has a larger inner diameter by 0 to 1.5 µm than an outer diameter of an optical fiber connector ferrule.

11. An optical receptacle according to claim 3, wherein the inner hole of the precision sleeve has a larger inner diameter by 0 to 1.5 µm than an outer diameter of an optical fiber connector ferrule.

12. An optical receptacle according to claim 9, wherein the inner hole of the precision sleeve has a larger inner diameter by 0 to 1.5 µm than an outer diameter of an optical fiber connector ferrule.

13. An optical receptacle according to claim 2, wherein a capillary of the stub with an optical fiber is formed of crystallized glass.

14. An optical receptacle according to claim 3, wherein a capillary of the stub with an optical fiber is formed of crystallized glass.

15. An optical receptacle according to claim 9, wherein a capillary of the stub with an optical fiber is formed of crystallized glass.

16. An optical receptacle according to claim 4, wherein a capillary of the stub with an optical fiber is formed of crystallized glass.

17. An optical receptacle according to claim 11, wherein a capillary of the stub with an optical fiber is formed of crystallized glass.

18. An optical receptacle according to claim 12, wherein a capillary of the stub with an optical fiber is formed of crystallized glass.

19. An optical receptacle according to claim 2, wherein the precision sleeve is formed of glass or crystallized glass.

20. An optical receptacle according to claim 3, wherein the precision sleeve is formed of glass or crystallized glass.

* * * * *